Aug. 17, 1954    B. G. COX    2,686,595
CENTRIFUGAL SEPARATOR
Filed Aug. 11, 1950    2 Sheets-Sheet 1
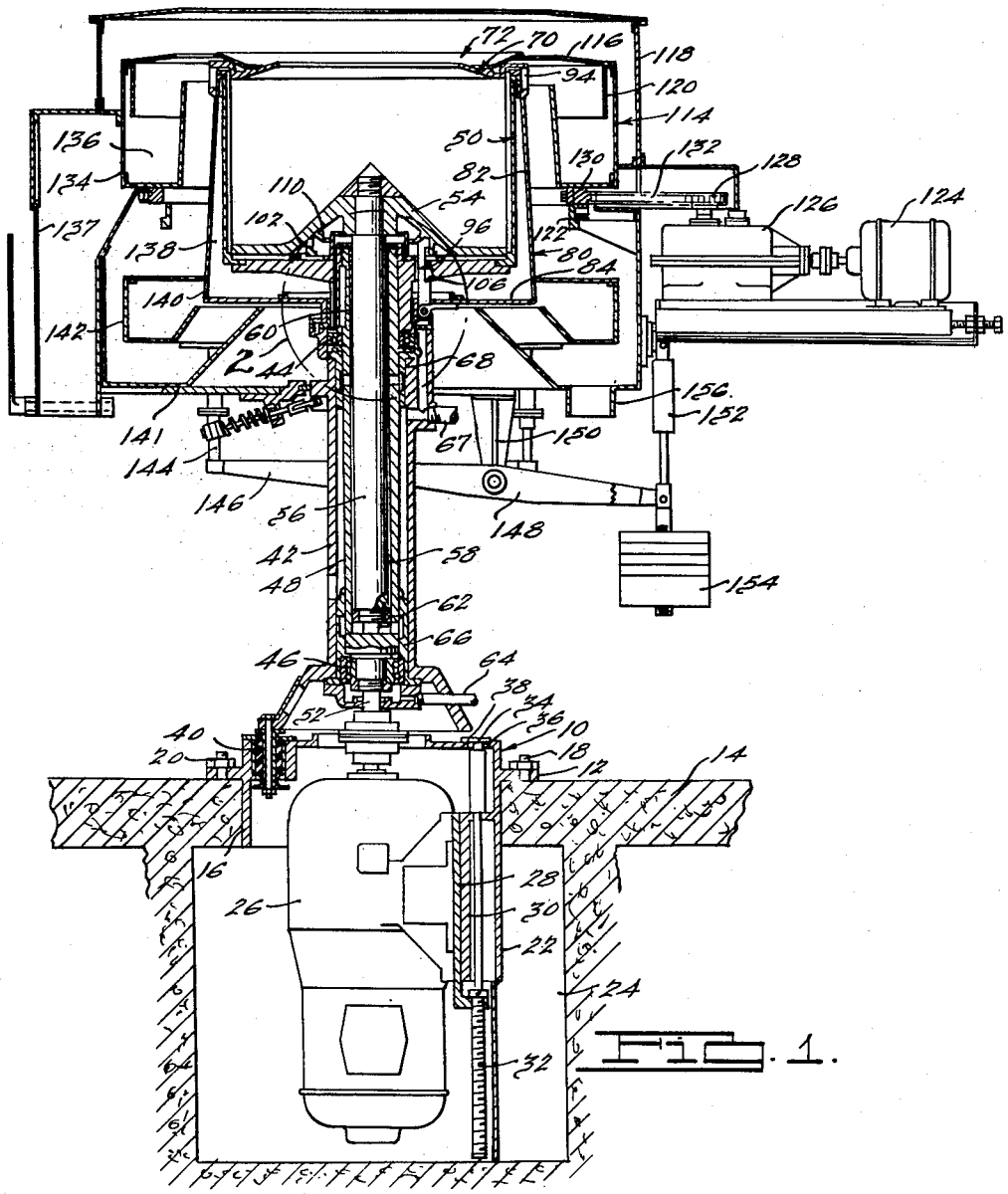
INVENTOR.
Bradley G. Cox.
BY
Harness, Dickey & Pierce.
ATTORNEYS.

Aug. 17, 1954   B. G. COX   2,686,595
CENTRIFUGAL SEPARATOR
Filed Aug. 11, 1950   2 Sheets-Sheet 2
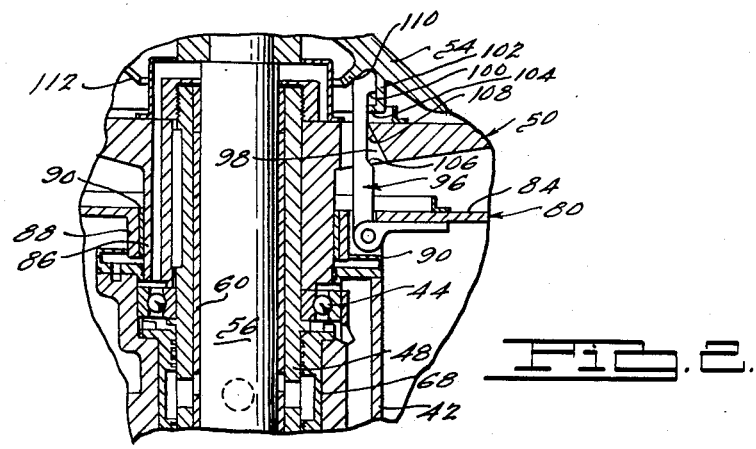
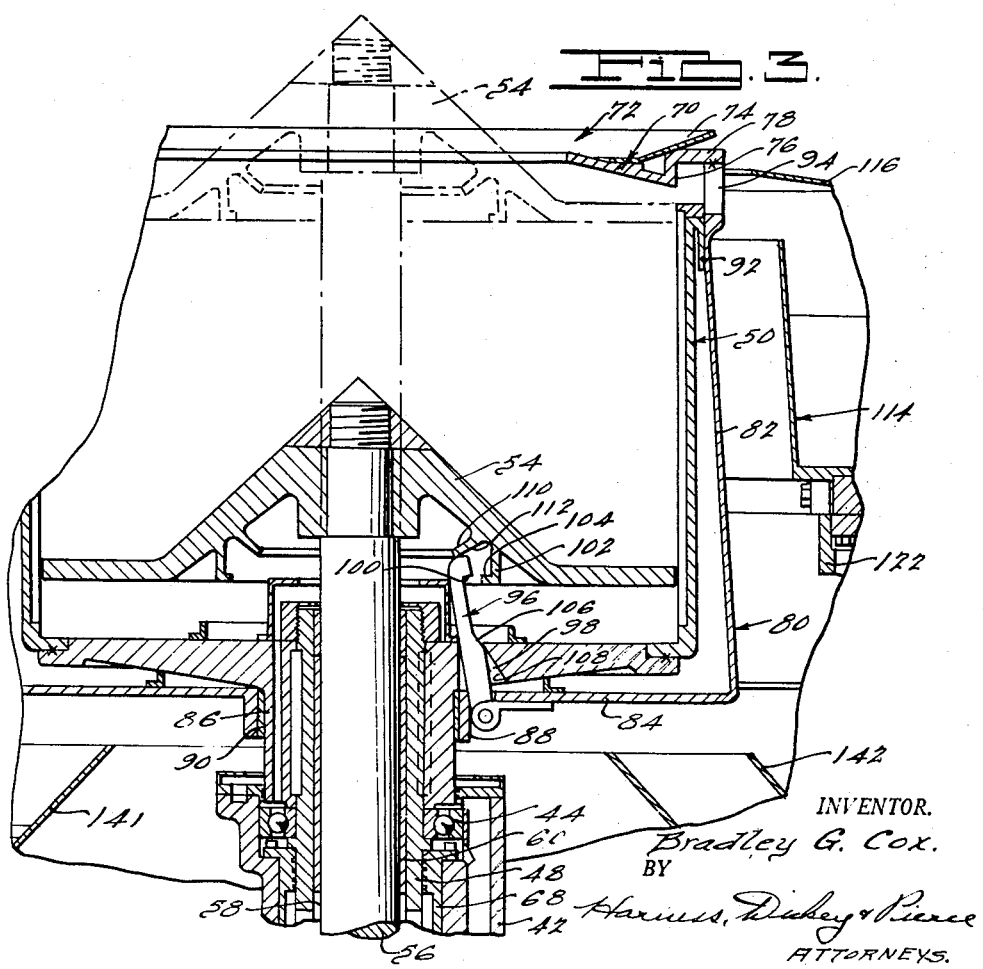
INVENTOR.
Bradley G. Cox.
BY
Harness, Dickey & Pierce
ATTORNEYS.

Patented Aug. 17, 1954

2,686,595

UNITED STATES PATENT OFFICE 2,686,595

CENTRIFUGAL SEPARATOR

Bradley G. Cox, Saginaw, Mich., assignor to Baker Perkins Inc., Saginaw, Mich., a corporation of New York Application August 11, 1950, Serial No. 178,880

17 Claims. (Cl. 210—73)

This invention relates broadly to new and useful improvements in centrifugal separators of the type used primarily for separating the mother liquor or sirup from sugar crystals.

In centrifugal separators of the above type, sirup containing sugar crystals is charged to a rotatable centrifuge basket while the latter is rotating at relatively high speed, and the mother liquor is thrown outwardly by centrifugal force through the foraminous side wall of the basket. When the sugar crystals have accumulated to a desired depth on the wall of the basket and the flow of sirup to the basket is shut off and the crystals are washed to remove traces or films of mother liquor adhering thereto. The sugar crystals are then discharged from the basket.

Sugar crystals conventionally are removed from the basket by means of a stripper which rotates with and is reciprocable in the basket. This stripper is disposed in the bottom of the basket as the crystals accumulate therein and, after the washing operation is completed, the stripper is either pushed upwardly in the basket or alternatively the basket is pulled downwardly on the stripper to discharge the crystals over the rim of the basket.

It also is conventional practice to provide a curb ring on the rim of the basket for retaining the sirup charged to the basket and for confining the crystals as they build up in the basket. It of course is necessary to remove or disengage this curb ring from the basket when the crystals are discharged therefrom. The curb ring must be disengaged from the basket while the latter is rotating at high speed, and various means have been suggested for accomplishing this operation in a simple and efficient manner.

The present invention is particularly concerned with means for co-ordinating the curb ring and the stripper. According to the present invention, the curb ring is mechanically connected to the stripper and the connecting means is detachable from the stripper. The curb ring is connected to the stripper at all times when the latter is in the bottom of the basket and the stripper acts through the connecting parts to hold the curb ring solidly on the rim of the basket during the centrifuging operation. When the stripper begins to rise in the basket to discharge the crystals it acts through the connecting parts to lift the curb ring from the basket so that the crystals can be discharged over the rim of the basket. However, as soon as the curb ring has been raised a requisite distance above the rim of the basket, the connecting elements are automatically disengaged from the stripper so that the latter is free to travel independently of the curb ring to discharge the crystals. The stripper rises to the very rim of the basket to fully discharge the crystals therefrom and thereafter it returns to the bottom of the basket to complete the discharging cycle. As the stripper approaches the end of its reciprocatory travel into the basket it again engages and automatically interlocks with the connecting elements to hold the curb ring solidly against the rim of the basket. The parts are then in the initial position ready for another operating cycle.

This construction and mode of operation have a number of advantages over prior art devices of this type and represent an improvement in the structure shown in the copending application of Cox and Evans, Serial No. 774,970, filed September 19, 1947, and issued July 21, 1953, as Patent No. 2,646,172, wherein the curb ring is caused to move with the stripper for the full vertical travel of the latter.

For one thing, the long travel of the curb ring causes a substantial shift in the center of gravity of the machine, and this has a significant, undesirable effect on its operation. Also, the relatively long travel of the curb ring requires that the nozzle for charging sirup to the basket and the wash pipe for delivering wash liquid thereto must be correspondingly longer. The longer charging nozzle and wash pipe result in more spillage and increased possibility of contamination. In addition, the size of the collector housings which surround the basket may be smaller in a construction wherein the travel of the curb ring is relatively short.

It also is a feature of this invention that the curb ring is mounted on an imperforate annular wall or shroud which surrounds the centrifuge basket instead of on vertical rods of the type shown in the copending application referred to above. The shroud performs a double function of providing a support and actuator for the curb ring and also of co-operating with the basket to define a chamber for receiving substances centrifuged from the bracket. The continuous imperforate construction of the shroud is much less dangerous to the operator of the machine than the rotating rods, and use of the shroud therefore eliminates a hazard with which the operator heretofore has had to cope. Further, unless exceedingly heavy rods are used there is a tendency for the rods to bow out and vibrate during operation of the machine. This is undesirable from the standpoint of noise in operation. Also, bowing causes the rods to bind in the bushings and the binding action occasionally becomes so great as to interfere or even prevent operation of the rods. Another disadvantage of the rod mounting for the curb ring is that the rods and the bushings in which they operate in time become covered with sirup which gradually becomes so sticky that it is difficult to slide the rods in the bushings.

With the foregoing as an introduction to the desirability and advantages of the construction embodying the instant invention, attention is directed to the drawings which form a part of this specification and wherein like numerals are employed to designate like parts throughout the same.

Fig. 1 is a vertical sectional view showing a centrifuging apparatus embodying the invention.

Fig. 2 is an enlarged view of that portion of the apparatus within the circle 2 of Fig. 1, and Fig. 3 is an enlarged sectional view illustrating the manner in which the stripper automatically engages with the mechanism for operating the curb ring as the stripper approaches the lower limit of its reciprocatory travel.

In the drawings, wherein for the purpose of illustration is shown a preferred embodiment of the invention, the numeral 10 designates a base for the machine having a radial flange 12 which overlies the floor 14 and a cylindrical portion 16 which extends downwardly through the floor. Studs 18 embedded in the flooring 14 extend upwardly through the base flange 12, and nuts 20 on the studs hold the base anchored solidly to the floor. At one side of the annular portion 16 is a support 22 which extends downwardly into a pit 24 or the like and carries a motor 26. The motor 26 is provided with a sliding base 28 which travels on a guide 30 at the inner side of support 22, and it is moved up and down on the guide by an adjusting screw 32. The upper end 34 of adjusting screw 32 extends into an opening 36 in the base 10 where it is readily accessible for operation. A removable cover plate 38 normally closes the opening 36.

Surmounting the base 10 and supported by resilient bearings 40 is a vertical support tube 42 which carries a centrifuge basket and pertinent apparatus. Within the support 42 and rotatably carried by upper and lower bearings 44 and 46 is a hollow shaft 48. The lower end of shaft 48 has a driven connection with the shaft 52 of motor 26, and a centrifuge basket 50, which preferably is similar to the one shown in the copending application supra, is splined on the upper end of shaft 48 so as to be rotatable therewith.

Within the centrifuge basket 50 is the usual stripper 54, and the latter is fastened centrally thereof to a pusher rod 56 which extends downwardly through the hollow shaft 48. The pusher rod 56 is smaller in diameter than the bore of shaft 48 to define an annular space 58 therebetween. A sleeve bushing 60 supports the upper end of rod 56 centrally within the shaft 48, and a piston bushing 62 supports the lower end of the rod centrally within the shaft. The bushing 62 in effect comprises a piston for vertically reciprocating the rod 56 and stripper 54. Hydraulic liquid introduced through pipe 64 is directed into shaft 48 below piston 62 by a distributor bushing 66, and hydraulic pressure against the piston raises the rod 56 and stripper 54. Conversely, hydraulic liquid introduced through pipe 67 is directed to the annular space 58 by a distributor bushing 68 and pressure of the liquid against the piston 62 moves the latter and associated parts downwardly.

Surmounting the basket 50 and rotatable therewith is a curb ring 70 which normally seats against the rim of the basket to confine the sirup and crystals charged to the basket. An annular overflow deflector 72 is provided on the curb ring and the deflector has an upwardly and outwardly inclined outer marginal portion 74. For reasons set forth in detail in the copending application supra and not pertinent to this invention, the curb ring 70 preferably is provided with an outwardly directed annular shoulder 76 which snugly fits the rim of the basket when the curb ring is lowered as shown in Fig. 1. Also, the curb ring 70 has a radially outwardly extending flange portion 78 which projects beyond the rim of the basket.

Outside the basket 50 is a shroud 80 having an annular wall portion 82 which surrounds and is spaced radially from the corresponding portion of the basket 50 and a bottom portion 84 which extends under the bottom of the basket. The bottom of basket 50 is formed centrally thereof with a depending hub portion 86 and the bottom 84 of the shroud 80 also is similarly formed with a hub portion 88 which surrounds and is slidable on the hub 86. A suitable bushing 90 inside the hub 88 provides a substantially fluidtight joint therebetween it and the hub 86. With respect to the annular wall portion 82 of the shroud 80, it will be observed that the basket 50 is formed adjacent the rim thereof with a depending, annular, essentially flexible skirt or flange 92 and that the wall 82 is slidably mounted on and guided by the flange. Thus, the flange 92 forms an annular, external bearing surface adjacent the rim of the basket 50 which fits snugly but slidably in the annular wall portion 82 so as to guide the latter during vertical movement thereof.

On and upstanding from the shroud 80 is an annular series of short metal bars or rods 94 which support and are welded or otherwise fixed to the projecting rim portion 78 of the curb ring 70. A sufficient number of the rods 94 is provided to support the curb ring 70 solidly on the shroud 80, and the individual bars are spaced sufficiently so that the sugar crystals pass readily therebetween when the stripper 54 is actuated to discharge the crystals from the basket 50.

As suggested, the curb ring 70 is adapted to seat on the rim of the basket 50 during the centrifuging operation and to be lifted from the basket a sufficient distance to permit discharge of the crystals during operation of the stripper 54. Also, it is desirable, if not essential, that the curb ring 70 be held downwardly against the rim of the basket 50 by suitable mechanical means during the centrifuging operation, as the curb ring functions to retain the crystals in the basket and the crystals usually build upon the wall of the basket substantially to the inner edge of the curb ring during a normal centrifuging operation. Thus, some pressure is exerted by the crystals against the curb ring tending to raise the latter from the basket and this force preferably is counteracted by suitable clamping means which holds the curb ring on the basket. However, the contacting surfaces of the basket 50 and curb ring 70 become coated with sirup during operation of the centrifuge, and the film of sirup on the surfaces causes the curb ring to stick to the basket and to resist raising of the curb ring from the basket preparatory to discharging the crystals therefrom. For this reason springs and equivalent means heretofore used to raise the curb ring have been generally unsatisfactory in use. It is a feature of this invention that the curb ring 70 is mechanically interconnected to the stripper 54 in such a way that the latter holds the curb ring solidly against the rim of the basket during the centrifuging operation and mechanically raises the curb ring from the basket during initial upward movement of the stripper preparatory to discharging the crystals. Since the stripper is hydraulically operated and the curb ring is mechanically connected to the stripper, ample force is provided to break any adhesion between the curb ring and the basket due to the intervening film of sirup liquor. However, according to the present invention the means which connects the curb ring to the stripper is uniquely adapted to disengage the latter after the curb ring has been lifted a distance sufficient to permit discharge of the crystals so that it is not necessary to raise and lower the curb ring the full distance traveled by the stripper. In this manner the center of gravity of the centrifuge is maintained more nearly constant than heretofore and attendant vibrations and other disadvantages associated with long travel of the curb ring are avoided. Also, by limiting the travel of the curb ring as described the entire unit may be made more compact and the charging nozzle and wash pipe may be made correspondingly shorter so as to decrease spillage and possibility of contamination.

More specifically, the bottom portion of shroud 80 is provided immediately around the hub 88 with a plurality of upstanding pivoted latches 96 which extend through openings 98 in the bottom of the basket 50. At the upper ends thereof the latches 96 are formed with radially outwardly extending, downwardly facing shoulders 100, and the stripper 54 is formed on the undersurface thereof with a depending annular flange 102 having an inturned radial lip 104. When the stripper 54 is fully lowered as shown in Fig. 1 the latches 96 are positioned vertically with the shoulders 100 overlying the lip 104 so that initial upward movement of the stripper engages the lip 104 with latches 96. Thereafter upward movement of the stripper 54 acts through latches 96 and shroud 80 to lift the curb ring 70 from the basket 52. However, it will be observed (Fig. 3) that the latches 96 are formed with inclined cam surfaces 106 which engage correspondingly inclined cam surfaces 108 in openings 98 after the stripper 54 has raised curb ring 70 a requisite distance, and the cam surfaces mutually coact to rock latches 96 inwardly out of engagement with the lip 104. Thereafter, the stripper may continue its travel to the broken-line position in Fig. 3 without further movement of the curb ring. As the stripper rises in the basket, it lifts the layer of crystals over the edge of the basket, and pressure of the crystals against the curb ring holds the latter raised. The entire operation is accomplished while the basket is rotating at a relatively high rate of speed and as the crystals move above the rim of the basket they are thrown outwardly by centrifugal force into a suitable housing. Upward movement of the stripper is terminated when it reaches the rim of the basket as shown by broken lines in Fig. 3, and, when the stripper reaches this position, all the crystals have been discharged from the basket. Thereafter pressure of the crystals against the curb ring of course ceases and the latter settles by gravity onto the basket as the stripper 54 is again moved downwardly to the bottom of the basket. When the curb ring 70 moves downwardly the latches 96 move away from cam surface 108. In order to assure interlocking engagement between the latches 96 and lip 104 the stripper 54 also is provided above the annular flange 102 with an inwardly and downwardly inclined annular flange 110. The undersurface of flange 110 defines a cam 112 which engages the upper ends of latches 96 as shown in Fig. 3 to swing the same outwardly with the shoulders 100 over lip 104 (Figs. 1 and 2). All of the parts have then been returned to the initial position preparatory to another cycle of operation.

The various housings for collecting the crystals, mother liquor, and wash water are generally similar to those described in copending application supra, and since they comprise no part of the present invention they are not described in detail. A cursory description of these parts, however, is given in order that a complete understanding of the machine here shown may be had.

The crystals are collected in an annular trough-shaped housing 114 which is mounted around and spaced radially from the upper portion of basket 50 and shroud 80. As perhaps best shown in Fig. 1, the inner wall of housing 114 terminates below the rim of basket 50 and the outer wall thereof extends above the rim of the basket. An inwardly and upwardly inclined ring 116 is mounted on the outer wall of the housing 114 to deflect crystals thrown outwardly from the basket during the stripping operation into the housing 114. Also, it will be observed that the inner edge of ring 116 is below the deflector ring 72 so that liquor or sirup falling onto the ring during charging of the basket or other operation of the apparatus is thrown by centrifugal force over the crystal housing 114. In this connection it will be readily appreciated that it is desirable to keep the crystals relatively dry. Liquid thrown from the deflector ring 72 is collected in housing 118. In the housing 114 the crystals impinge against an annular blanket or drop 120 of rubber or the like which absorbs the impact and prevents breakage of the crystals. The side walls of housing 114 are stationary and the bottom which is formed separately from the side walls is mounted for rotation on an annular track 122. In operation, the bottom of the housing 114 is rotated slowly by a motor 124 which drives a speed reducer 126 having a pinion 128 on the output shaft thereof and the pinion is drivingly connected to a ring gear 130 on the bottom of housing 114 by an endless chain 132. Sugar crystals accumulating on the bottom of housing 114 are pushed through an opening 134 in the outer wall of the housing by a plow 136. Crystals discharged from the housing are collected in a bin 137 from which they are removed either continuously or periodically as desired.

As suggested, the mother liquor which is charged to the basket 50 with the crystals is removed centrifugally and thereafter the crystals are washed with water to flush away sirup or liquor adhering thereto. The mother liquor is susceptible of further processing, and it therefore is desirable to collect it separately from the wash water. Both the mother liquor and the wash water are thrown outwardly by centrifugal force through the foraminous side wall of the basket 50, collected in a chamber 138 defined by the basket and the shroud 80 and discharged through openings 140 provided adjacent the bottom of the shroud. A housing 141 is provided around the lower portion of shroud 80 and a smaller annular housing 142 is provided in the housing 141. The relatively small housing 142 is supported by rods 144 which extend through the bottom of the housing 141 and the rods are connected below the housing by crossbars 146. The crossbars 146 are connected to a rockshaft 148 pivoted to the support 150, and the rockshaft is oscillated about its pivot by a fluid motor 152. A counterweight 154 depends from the rockshaft 148 below fluid motor 152.

When the mother liquor is being centrifuged from the crystals, the housing 142 is positioned in register with the openings 140, as shown in Fig. 1, so that the mother liquor discharged from chamber 138 is collected therein. The liquor is then discharged from the housing 142 in any suitable manner for further processing. However, after the mother liquor has been centrifuged from the crystals and before the washing operation, the housing 142 is lowered below the discharge openings 140 by actuation of fluid motor 152 and thereafter the wash water is collected in housing 141. The water is discharged from housing 141 through a discharge spout 156 and thence through means not shown to a suitable place of disposal.

The operation of the apparatus is as follows:

The basket 50 is rotated continuously by motor 26, though its speed may be varied somewhat in the different phases or stages of operation. Sirup containing sugar crystals is charged to the basket 50 while the latter is rotating at relatively high speeds, and the mother liquor is immediately thrown outwardly into chamber 138 through the perforate side wall of the basket. During this stage of the operation, housing 142 is raised to receive the liquor and the latter is discharged from the housing and collected for further processing as described above. Sirup is charged to the basket 50 until the sugar crystals have built up to a suitable depth on the wall of the basket and the charging valve is then shut off. Thereafter the basket is caused to rotate until all of the mother liquor that can be removed by centrifugal force has been removed.

When the above phase of the operation is completed the liquor housing 142 is lowered so that openings 140 discharge into housing 141. Rinse water is then sprayed into basket 50 according to conventional practice to wash the sugar crystals. As suggested, the basket 50 is rotated continuously during these operations so that the wash water passes through the bed of crystals and is discharged into chamber 138. As the water passes through the crystals it washes them and dissolves mother liquor adhering thereto. From chamber 138 the wash water passes into housing 141 and thence through discharge spout 156 to a suitable place of disposal. Thereafter, wash water to the basket 50 is shut off and the basket continues to rotate for a short time until the crystals are relatively dry.

After the washing operation is completed, the stripper 54 is raised in the basket 50 to push the layer of crystals accumulated in the latter over the rim thereof. As the stripper 54 rises, it lifts the curb ring 70 from the basket 50 as described, so that the sugar crystals pass over the rim and into housing 114. As suggested, crystals pushed over the rim of the basket 50 are thrown by centrifugal force into the housing 114 where they are collected and discharged into the bin 136. When the stripper 54 reaches the top of the basket, as shown by broken lines in Fig. 3, the basket is entirely emptied of crystals and the stripper is then returned to the bottom of the basket as shown by full lines in Figs. 1 and 2. As the stripper approaches the lower limit of its travel, it mechanically interlocks with latches 96 and pulls the curb ring 70 firmly against the rim of the basket 50.

The above series of steps completes the cycle of operation and prepares the apparatus for a new operating cycle.

Having thus described the invention, I claim:

1. In a centrifugal separator, a rotatable centrifuge basket, a stripper reciprocable in and rotatable with said basket, a curb ring seating against the rim of the basket, a support attached to the curb ring and disposed exteriorly of the basket, catch means carried by said support detachably connected to and movable with said stripper, said catch means fastening said support to said stripper so that initial reciprocatory movement of the stripper in the basket disengages the curb ring from the basket positively mechanically, and catch releasing means disposed in the path of travel of said catch means and positioned to engage therewith after initial reciprocatory movement of the stripper, said catch-releasing means being operative to disengage said catch means from the stripper after initial movement of the stripper so that the latter is free to complete its reciprocatory travel without further actuating said curb ring.

2. In a centrifugal separator, a rotatable centrifuge basket, a stripper reciprocable in and rotatable with said basket, a curb ring seating against the rim of the basket, a support for the curb ring having a portion attached to the curb ring and disposed exteriorly of the basket and a portion extending under the basket, latch elements on the last-mentioned portion of said support detachably fastened to and movable with said stripper, said latch elements and said support interconnecting the stripper and the curb ring so that reciprocation of the stripper in the basket disengages the curb ring from the basket, and latch-releasing means positioned to engage said latch elements operative by reason of said engagement to disengage said latch elements from said stripper at a predetermined point in the reciprocatory travel of the latter.

3. In a centrifugal separator, a rotatable centrifuge basket having a rim and an annular external bearing surface adacent said rim, a stripper reciprocable in and rotatable with said basket, a curb ring seating against the rim of the basket, a support for the curb ring having a portion attached to said curb ring and a portion extending under the basket, said first-mentioned portion of the support being disposed externally of the basket and guided on said bearing surface, latch means carried by the support detachably connected to and movable with the stripper fastening said support to said stripper so that initial movement of the stripper in the basket disengages the curb ring from the basket, and latch-releasing means disposed in the path of travel of said latch means engageable with the latter to disengage the same from the stripper after said initial movement.

4. In a centrifugal separator, a rotatable centrifuge basket having a rim and a flexible annular external skirt adjacent said rim providing a bearing surface on the outside of the basket, a stripper reciprocable in and rotatable with said basket, a curb ring seating against the rim of the basket, a support for the curb ring, said support having a surrounding portion attached to the curb ring and guided on the external bearing surface of the basket, said support also having a portion extending under the basket, latch means carried by the last-mentioned portion of the support detachably connected to and movable with the stripper, said latch means fastening the support to the stripper so that initial movement of said stripper in the basket positively and mechanically disengages the curb ring from the basket, and abutments disposed in the path of travel of said latch means and engageable therewith after said initial movement to release said latch means from the stripper so that the latter is free to complete its travel without imparting further movement to the curb ring.

5. In a centrifugal separator, a rotatable centrifuge basket, a stripper reciprocable in and rotatable with said basket, a curb ring seating against the rim of the basket, a support attached to the curb ring disposed exteriorly of and extending under the basket, latch means carried by the support and detachably connected to said stripper, and means coactive with said latch means rendered operative by reciprocatory travel of the stripper to disengage the latch means from the stripper.

6. In a centrifugal separator, a rotatable centrifuge basket, a stripper reciprocable in and rotatable with said basket, a curb ring seating against the rim of the basket, a support attached to the curb ring disposed exteriorly of and extending under the basket, pivoted latch elements carried by the support extending through the bottom of the basket and detachably connected to said stripper, and coactive cam surfaces on the latch element and the basket engageable by reciprocatory travel of the stripper to disengage the latch element from the stripper.

7. In a centrifugal separator, a rotatable centrifuge basket, a stripper reciprocable in and rotatable with said basket, a curb ring seating against the rim of the basket, a support attached to the curb ring disposed exteriorly of and extending under the basket, pivoted latch elements carried by the support extending through the bottom of the basket and detachably connected to said stripper, means rendered operative by reciprocatory travel of the stripper in one direction for disengaging the latch elements from the stripper, and separate means rendered operative by reciprocatory travel of the stripper in the opposite direction for engaging the latch elements with the stripper.

8. In a centrifugal separator, a rotatable centrifuge basket, a stripper reciprocable in and rotatable with said basket, a curb ring seating against the rim of the basket, a support attached to the curb ring disposed exteriorly of and extending under the basket, pivoted latches carried by the support extending through the bottom of the basket and detachably fastened to said stripper, cam means on the bottom of the basket engageable with said latch elements by reciprocation of the stripper in one direction to disengage the latch elements from the stripper, and cam means on the stripper engageable with the latch elements by reciprocation of the stripper in the opposite direction to move said latch elements into engagement with the stripper.

9. In a centrifugal separator, a rotatable centrifuge basket, a stripper reciprocable in and rotatable with said basket, a curb ring seating against the rim of the basket, an annular housing surrounding the basket attached to and forming a support for the curb ring, latch elements carried by said housing detachably connected to the stripper, means operable by reciprocatory travel of said stripper in one direction to disengage the latch elements from the stripper, and separate means rendered operative by reciprocatory travel of the stripper in the opposite direction to engage said latch elements with said stripper.

10. In a centrifugal separator, a rotatable centrifuge basket, a stripper reciprocable in and rotatable with said basket, a curb ring seating against the rim of the basket, a support attached to the curb ring and disposed exteriorly of the basket, an annular flange on the undersurface of said stripper having an inturned annular lip thereon, pivoted latch elements carried by the support extending through the bottom of the basket and interengaging with the lip portion of said flange, cam means on the bottom of the basket engageable with said latch elements upon reciprocation of the stripper in one direction to release said latch elements from said lip portion, and a second annular flange extending angularly from the undersurface of the stripper engageable with said latch elements upon reciprocation of the stripper in the opposite direction to cam the latch elements into engagement with said lip portion.

11. In a centrifugal separator, a rotatable centrifuge basket having a central external hub on the bottom thereof, a stripper reciprocable in and rotatable with said basket, a curb ring seating against the rim of the basket, a support having an annular wall portion surrounding the basket and a bottom portion extending under the basket, the wall portion of said support being attached to the curb ring and guided on the wall of the basket adjacent the rim thereof, the bottom portion of said support being journaled on and guided by the hub portion of said basket, pivoted latch elements carried by the bottom portion of said support extending through the bottom of the basket and detachably fastened to said stripper, said latch elements and said support connecting the curb ring to the stripper for mutual operation during at least a portion of the reciprocatory travel of the latter, cam surfaces on the bottom of the basket engageable with said latch elements by reciprocation of the stripper in one direction to disengage the latch elements from the stripper, and cam surfaces on the stripper engageable with said latch elements by reciprocation of the stripper in the opposite direction to move such latch elements into engagement with the stripper.

12. In a centrifugal separator, a rotatable centrifuge basket having a central hub portion, a curb ring surmounting and seating against the rim of the basket, a housing receiving and spaced from said basket and connected to said curb ring, and means for moving said housing axially on said basket, said housing providing a support and actuator for moving the curb ring axially and spaced from the basket to define a chamber for receiving substances centrifuged from the basket.

13. In a centrifugal separator, a rotatable centrifuge basket having a central hub portion, a curb ring surmounting and seating against the rim of the basket and movable relative thereto, a housing receiving and spaced from said basket and connected to said curb ring, a reciprocable stripper positionable adjacent the bottom of the basket, and means connecting the stripper and housing for mutual operation when the stripper is positioned adjacent the bottom of the basket so that reciprocatory movement of the stripper acts through the housing to move the curb ring relative to the basket.

14. In a centrifugal separator, a rotatable centrifuge basket having a central hub portion, a curb ring surmounting and seating against the rim of the basket and liftable therefrom, a housing receiving and spaced from said basket and connected to said curb ring, a reciprocable member and means detachably connecting the housing to said reciprocable member for mutual reciprocatory travel relative to the basket during initial movement of said reciprocatory member in one direction.

15. In a centrifugal separator, a rotatable centrifuge basket having a central hub portion, a curb ring surmounting and seating against the rim of the basket, a housing receiving and spaced from said basket connected to said curb ring, and pivoted latch means on the housing extending through the bottom of the basket and detachably fastened to said stripper.

16. In a centrifugal separator, a rotatable centrifuge basket having a central hub portion, a curb ring surmounting and seating against the rim of the basket, a housing receiving and spaced from said basket connected to said curb ring, pivoted latch means on the housing extending through the bottom of the basket and detachably fastened to said stripper, and means rendered operative by a predetermined reciprocatory movement of the stripper in one direction to disengage the latch means from said stripper.

17. In a centrifugal separator, a rotatable centrifuge basket having a central hub portion, a curb ring surmounting and seating against the rim of the basket, a housing receiving and spaced from said basket connected to said curb ring, pivoted latch means on the housing extending through the bottom of the basket and detachably fastened to said stripper, means rendered operative by a predetermined reciprocatory movement of the stripper in one direction to disengage the latch means from said stripper, and means rendered operative by return movement of the stripper to move said latch means again into engagement with said stripper.

References Cited in the file of this patent

UNITED STATES PATENTS

| Number | Name | Date |
|---|---|---|
| 1,212,638 | Herr | Jan. 16, 1917 |
| 1,749,370 | Behr | Mar. 4, 1930 |
| 2,232,770 | Buddeberg | Feb. 25, 1941 |
| 2,646,172 | Cox et al. | July 21, 1953 |

FOREIGN PATENTS

| Number | Country | Date |
|---|---|---|
| 36,848 | Austria | Apr. 10, 1909 |
| 374,601 | France | June 18, 1907 |